Nov. 16, 1926. 1,607,214
J. W. SMITH
CUTTING KNIFE FOR MEAT GRINDING MACHINES
Filed Feb. 26, 1926
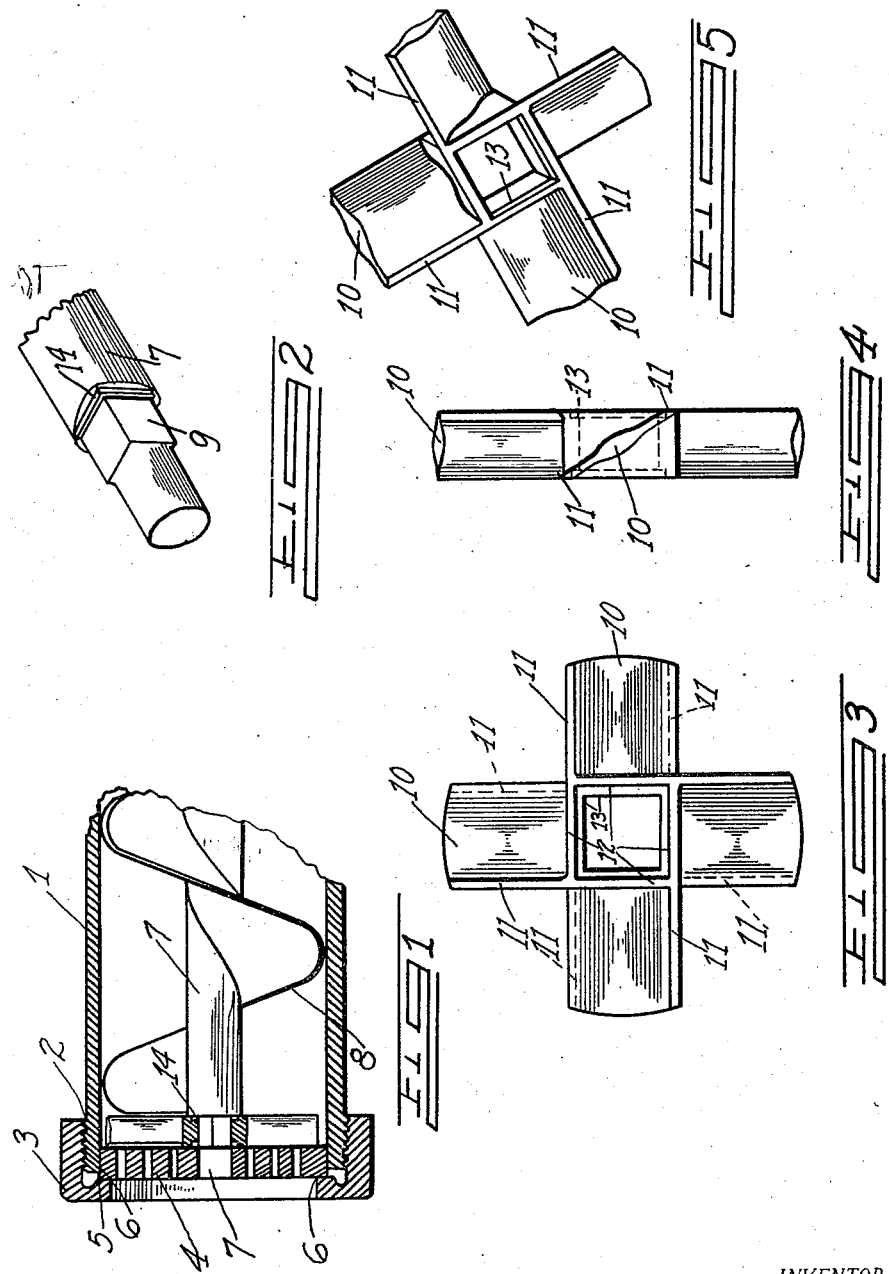
INVENTOR.
James W Smith
BY
Allen & Allen
ATTORNEYS Patented Nov. 16, 1926.

1,607,214

UNITED STATES PATENT OFFICE.

JAMES W. SMITH, OF CINCINNATI, OHIO.

CUTTING KNIFE FOR MEAT-GRINDING MACHINES.

Application filed February 26, 1926. Serial No. 90,803.

My invention relates to cutting knives and particularly in combination with a meat grinding machine for a novel type of cutting knife which shall be reversible and more efficient than any knife in use prior to my invention.

In the art the use of meat grinding machines which have a tubular discharging compartment in which a worm serves to advance the meat to the perforated plate through which the meat is squeezed prior to its discharge, is old. It is also old to mount a knife on the shaft carrying the worm, which knife engages the inner face of the perforated plate and so cuts the strands of meat into pieces. In most structures the knife is formed with a hub having a square hole which fits over a squared portion of the shaft. The outer face of the knife bears against the perforated plate and is subject to wear particularly as the bearing against the knife is all on the cutting portions of the blade.

It is the object of my invention to provide a knife so shaped that there will be a hub bearing on the outer face of the knife in alignment with the cutting edges of the blades of the knife so that wear on the knife will be evenly distributed over the whole engaging surface. It is a further object of my invention to construct a knife that it may be withdrawn and reversed on the shaft and will then provide a new cutting edge with a hub bearing similar to that of the original forwardly disposed face. A still further object of my invention is the provision of a knife which by its hub construction will avoid the tendency for meat to become wrapped around the shaft and thus frictionally retard the operation of the machine.

Referring to the drawing in which I have illustrated my preferred type of knife:

Figure 1 is a sectional view of the discharging end of a meat grinding machine with one of my novel knives shown in operative position.

Figure 2 is a perspective view of the usual type of shaft end on which the knife may be mounted.

Figure 3 is a plan view of the knife.

Figure 4 is a side elevation of the knife.

Figure 5 is a perspective view showing the details of structure of the knife.

In Figure 1 I have illustrated the meat grinding machine casing 1 having threads 2 at the outer end of the casing on which the threaded ring 3 is mounted. Within the casing a perforated plate 4 is mounted and secured in non-rotative position by means of a lug 5 which engages a groove in the upper side of the casing. The perforated plate 4 is held in position by the annular shoulder 6 of the threaded ring. Within the casing a shaft 7 having a worm 8 is adapted to advance the meat to the delivery end of the casing. The shaft usually has an end which journals in a central opening in the perforated plate. For purposes of mounting the cutting knife a portion of the shaft is squared as indicated at 9. The cutting knife has a plurality of blades having cutting edges which bear against the plate 4.

The foregoing description applies to what has been standard practice in manufacturing meat grinding machines for a number of years. Such a structure is described in the Baker Patent #339,834, of April 13, 1886, and well illustrated in Figure 2 of the Baker patent. My invention consists only in an improved knife structure to replace the old type of knife which has a number of disadvantages. The greatest difficulty with the old type of knife is that it allows strands of the ground meat to wind around the hub of the knife and eventually block the free operation of the grinder. Further the knives which have been provided heretofore have had recessed faces on the hubs which cause the whole wear to fall on the cutting knives.

My novel type cutting knife is constructed as follows. The knife has a plurality of blades 10. Each of the blades has a cutting edge 11 at both the top and bottom of the blade. A hub portion 12 is extended in alignment with each of the cutting edges so that there is almost as much bearing provided by the hub, as by the cutting faces of the knives. This extension of the hub in four sections in alignment with the faces of the cutting knives is an essential feature of my invention and the novel usefulness of such a structure lies in the fact that the strands of meat which work in toward the hub are cut up instead of being allowed to wind around the hub. Further with the increased bearing surface of the knife the knives do not require such frequent resharpening. By constructing the knife with corresponding cutting edges and extended hubs the knife may be reversed on the shaft so that should one series of cutting edges become dulled by striking pieces of bone in the meat it will be a simple matter to unscrew the ring member and reverse the position of the knife on the shaft.

While I have shown the knife with ledges 13 formed in the squared inner orifice such a construction is not essential. On the type of grinding machine with which my knife has been successfully used, squared ridges 14 were provided, so for preventing rocking movement of the knife on the squared portion of the shaft it seemed advisable to provide the ledges as shown.

Modifications in structure which consist merely in the change of direction of the blades with relation to the hub I consider within the scope of my invention.

Having thus described my invention, what I claim as new and desire to secure by Letters Patent, is:—

1. A cutting knife having a hub with a central aperture shaped so as to engage a rotatable shaft, a plurality of cutting blades each having at least one cutting edge extended from its outer end beyond the axis of the hub, and said extensions of each of the cutting edges beyond the axis of the hub meeting at an angle of another cutting edge.

2. A cutting knife having a hub with a central aperture shaped so as to engage a rotatable shaft, a plurality of blades extended from the hub, each of said blades having at least one cutting edge and each cutting edge extending across the hub into another cutting edge at an angle thereto.

3. A cutting knife having a hub with a central aperture for mounting on a shaft, a plurality of blades extended from the hub transversely to the axis of said hub, each of said blades having at least one cutting edge, and each of said cutting edges extending from the outer end of a blade into the cutting edge of an adjacent blade.

4. A cutting knife having a hub with a central aperture for mounting on a shaft, a plurality of blades extended from the hub transversely to the axis of said hub, and each of said blades having parallel cutting edges on each side thereof and each of said cutting edges extended from the outer end of a blade into a cutting edge on an adjacent blade at an angle.

JAMES W. SMITH.